United States Patent [19]
Bilbert et al.

[11] 4,096,760
[45] Jun. 27, 1978

[54] PRESSURE GAUGE

[75] Inventors: Paul Bilbert, Burgstadt; Ewald Rössner, Obernburg, both of Germany

[73] Assignee: Alexander Wiegand GmbH u. Co., Armaturen- u.Manometerfabrik, Klingenberg, Germany

[21] Appl. No.: 805,603

[22] Filed: Jun. 10, 1977

[51] Int. Cl.² ............................................. G01L 7/04
[52] U.S. Cl. .................................................. 73/738
[58] Field of Search ...................... 73/416, 431, 738; 137/60; 220/85 B, 89 A

[56] References Cited
U.S. PATENT DOCUMENTS 3,938,393  2/1976  Mogensen ............................. 73/416

Primary Examiner—Donald O. Woodiel
Attorney, Agent, or Firm—Amster & Rothstein

[57] ABSTRACT

A pressure gauge comprising a rigid housing in which a gauge member is located whose interior is subjected to the pressure to be measured. The housing includes a pressure equalizing device in the form of a cup-shaped resilient membrane or a resilient bellows which is subjected to the interior pressure of the housing on the one side and to the ambient pressure on the other side. Furthermore, a closure element which can be blown out is snapped into position in an opening in said housing. The pressure equalizing device is secured to said closure element and is supported by it, thereby simplifying the installation of said pressure equalizing device in the housing.

4 Claims, 4 Drawing Figures

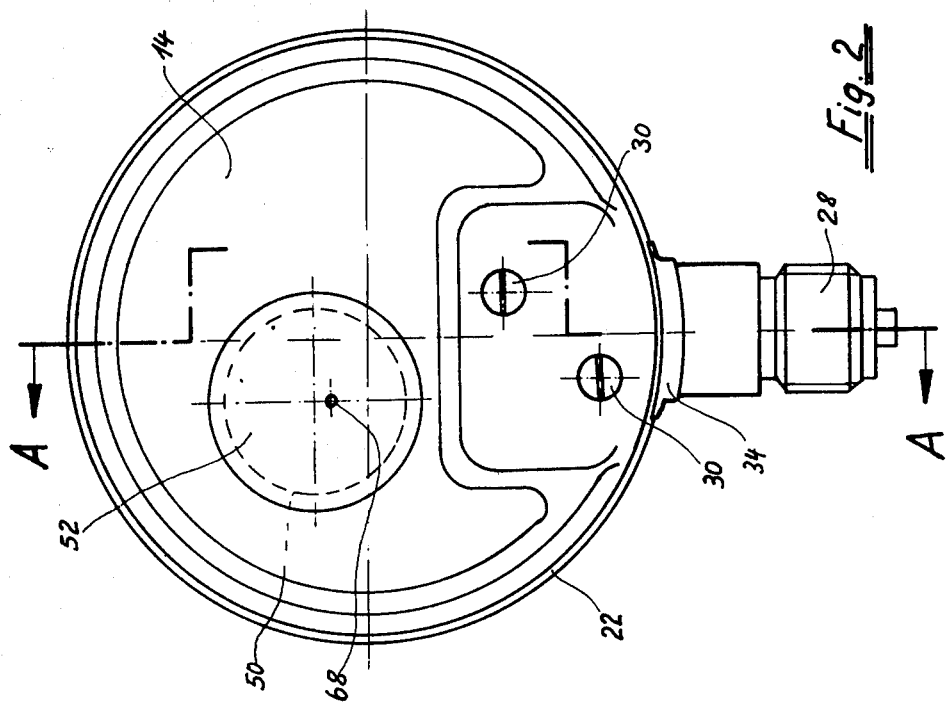
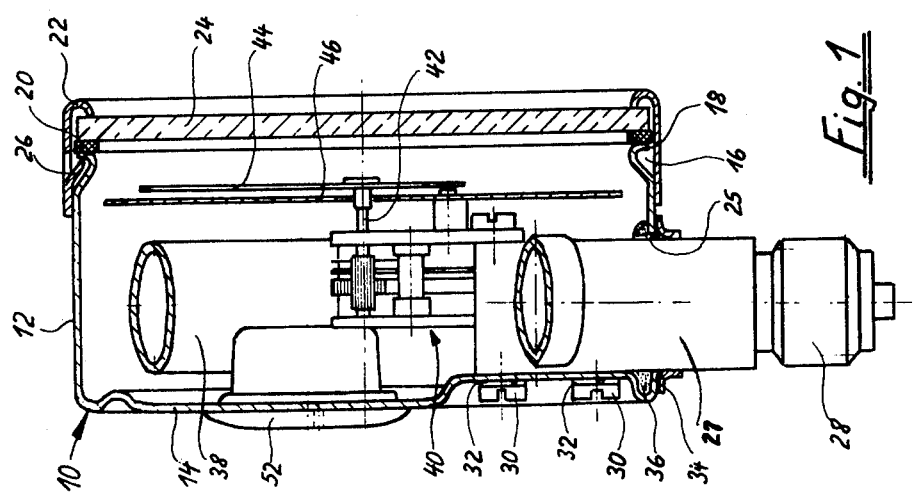

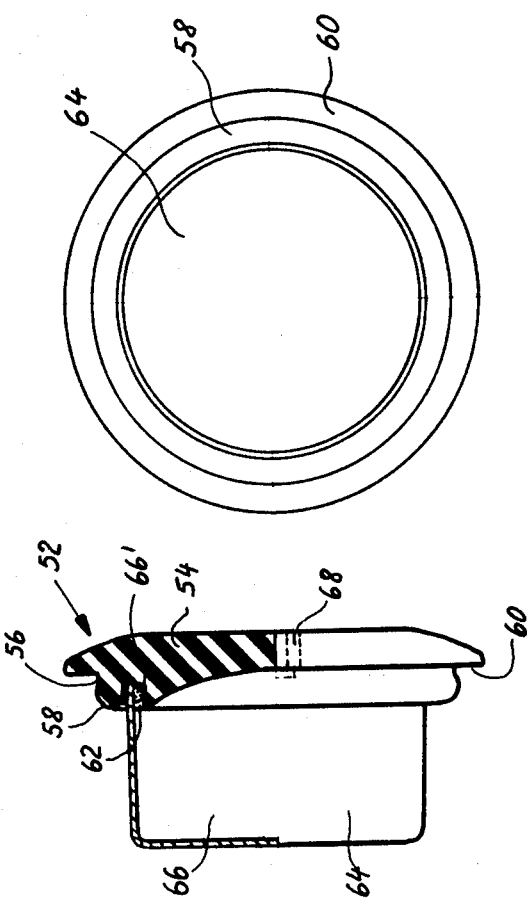

PRESSURE GAUGE

FIELD OF THE INVENTION

This invention relates to pressure gauges, and in particular pressure gauges comprising a rigid housing in whose interior a gauge member, a pointer mechanism connected with said gauge member as well as a pointer for indicating the pressure are located, further comprising a pressure equalizing device which ensures pressure equalization between the interior of the housing and the ambience, as well as a closure element adapted to be blown out and located in a housing segment which is blown out of said housing when the pressure in the housing exceeds a specific limit so that this pressure is dissipated and the pressure gauge does not burst or explode. The pressure gauge with the pressure equalizing device in accordance with the invention is normally filled with an damping liquid.

BACKGROUND OF THE INVENTION

A liquid-filled pressure gauge with a pressure equalizing device is already known from U.S. patent specification No. 2,935,873 which is disposed as a flat resilient membrane in a chamber formed by the double-walled and interrupted rear wall of the rigid housing. This pressure gauge measures the pressure which acts externally on the liquid filling. This pressure gauge has no safety features to prevent explosion or bursting.

A pressure gauge is known from U.S. patent specification No. 3,177,722 which has an opening in the rear wall of the housing into which a flat closure element is inserted which is blown out of the opening when the pressure in the interior of the housing exceeds a specific level. This level is determined in such a manner that it is not reached during normal operation of the pressure gauge, but is only exceeded when the gauge member, e.g. a Bourdon tube or tubular spring, bursts due to the internal pressure in the tube. The closure element thus constitutes a safety measure to prevent explosion or bursting, since it is blown out before the the excessive internal pressure tears the housing open or breaks the view plate secured to the housing. This would result in serious danger to persons in the vicinity of the pressure gauge.

If a pressure gauge is filled with a damping liquid, a pressure difference between the interior of the housing and the ambience can be produced due to the differences in temperature between the interior of the housing and the surroundings, thus producing excess pressure in the housing. This excess pressure in the housing affects the movement of the gauge member and thus causes erroneous indications or readings on the pressure gauge. It is therefore expedient to compensate the pressure between the interior of the housing and the surroundings. Although the closure element of the pressure gauge in accordance with U.S. patent specification No. 3,177,722 is resilient, its resiliency is not adequate to ensure the required pressure equalization between the interior of the housing and the ambience, since, on the other hand, it must be so stiff that it does not yield to the internal pressure in the housing until a specific value has been exceeded. The closure element of the known pressure gauge thus does not constitute a pressure equalizing device.

Liquid-filled pressure gauges are also already known which have both a closure element adapted to be blown out as well as a pressure equalizing device.

German laying-open print (DT-OS) 2,249,266 describes a pressure gauge into which a resilient membrane with a cylindrical edge can be inserted. The diameter of this membrane is equal to the internal diameter of the housing. A stiff housing rear wall with a vent hole is inserted into the cylindrical edge of the membrane in turn, so that the cylindrical edge of the resilient membrane is clamped in position between the edge of the rigid housing rear wall and the peripheral wall of the housing. The pressure is equalized in that the membrane is deflected to a greater or lesser extent. If the internal pressure in the housing exceeds the specific value, the membrane and the housing rear wall will be blown out.

A similar combination of a pressure equalizing device and a closure element adapted to be blown out is also known from U.S. patent specification No. 3,938,393. The pressure equalizing device is formed by a resilient bellows which is inserted into an opening in the rear wall of the housing which has a substantially smaller diameter than said housing. A plate-shaped and relatively rigid closure element is inserted into the interior of the bellows so that the cylindrical portion of the bellows is clamped between the edge of said closure element and the edge of the opening. The closure element and the bellows thus hold themselves mutually in the opening due to their interference fit.

It has been found that the combination of closure element and pressure equalizing device known from German laying-out print 2,249,266 and U.S. patent specification No. 3,938,393 has certain drawbacks. The membrane or the bellows must be manufactured of a relatively soft resilient material so that they can execute the function of pressure equalization. Because this material is relatively soft, the clamped closure element or the clamped rear wall may not be adequately held in place so that there is danger that the rear wall or the closure element will be separated from the housing due to vibration or inadvertent jolts so that the pressure gauge will become at least leaky and unsealed and consequently useless. In order to increase the force of retention acting on the rear wall or the closure element, the pressure between the edge of the rear wall and the peripheral wall of the housing or between the edge of the closure element and the edge of the opening is increased. Accordingly, the pressure exerted on the clamped section of the membrane or the bellows will increase as well, however, so that this section will be squeezed together to a greater degree. Due to the softness of the material of the membrane or of the bellows, there is danger that the bellows will be damaged in this section so that it no longer seals sufficiently and permits the equalizing liquid to escape, insofar as the pressure gauge is filled with equalizing liquid.

Another drawback of the known combination of closure element and pressure equalizing device is that the membrane and the rear wall or the closure element and the bellows must be inserted into the housing at the same time, thereby making assembly of the pressure gauge more difficult and troublesome. If, in order to avoid this disadvantage, the rear wall and the membrane or the closure element and the bellows are first assembled and thereafter inserted into the housing, there is danger that they will separate beforehand since the retentive force of the membrane or the bellows alone is only very low.

Summary of the Invention

The object of the invention is to obviate the drawbacks described hereinbefore.

Another object of the invention is to provide a pressure gauge with a pressure equalizing device and a closure element adapted to be blown out, in which the closure element adapted to be blown out is held in position reliably by the housing and cannot be released inadvertently.

Yet another object of the invention is to provide a pressure gauge comprising a resilient pressure equalizing device and a closure element adapted to be blown out, in which the resilient pressure equalizing device is not subjected to the danger of being damaged by the closure element.

Yet another object of the invention is to provide a pressure gauge with a pressure equalizing device and a closure element whose assembly is as simple as possible.

The pressure gauge in accordance with the invention comprises a rigid housing, a view plate which seals off the front side of the housing, a gauge member in the interior of said housing, said gauge member being rigidly connected with a gauge member support projecting from the housing on the one hand and, on the other hand, being articulated with a pointer mechanism which transfers the movement of the gauge member to a pointer which can be observed through said view plate, further comprising an opening in a wall section of said housing, a closure element with a groove which extends about the periphery, which is open in a radially outwardly direction and which matches the edge of said opening, which sealingly engages said edge of said opening, thereby retaining the said closure element in said opening, said closure element being pressed out of said opening when the pressure in the interior of said housing exceeds a specific value, further comprising a resilient membrane supported by said closure element whose edge is sealingly secured to said closure element along its entire length and which is located on the side of said closure element which faces towards the housing interior, and finally comprising a vent hole in said closure element.

In the case of the pressure gauge in accordance with the invention, the resilient membrane is supported by the closure element which itself is snapped into place directly into the opening in the housing. The membrane is not clamped between the edge of the opening and the peripheral groove of the closure element. The reliable positioning of the closure element in the opening is thus not dependent on the membrane and, moreover, the membrane is not squeezed between the closure element and the housing. Since the membrane is supported by the closure element, it can be finally positioned and firmly fixed in position on the closure element before the closure element is snapped into the opening. This greatly simplifies assembly of the inventive pressure gauge. Other objects, features and advantages of the present invention can be seen from the following description of one embodiment of the invention with reference to the drawings as well as to the patent claims.

BRIEF DESCRIPTION OF THE DRAWINGS

FIG. 1 is a sectional elevation through a preferred embodiment of the pressure gauge substantially along A—A in FIG. 2;

FIG. 2 illustrates the pressure gauge from the left in FIG. 1;

FIG. 3 shows on an enlarged scale a closure element comprising a membrane secured thereto for the pressure gauge according to FIGS. 1 and 2, the lower half of FIG. 1 being a plan elevation and the upper half thereof being a sectional elevation; and FIG. 4 is a plan elevation of the closure element and the membrane from the left in FIG. 3.

DETAILED DESCRIPTION OF THE DRAWINGS

The pressure gauge illustrated in FIG. 1 comprises a housing 10 which includes a cylindrical peripheral wall 12 and a rear wall 14. The housing is manufactured of deep-drawn sheet metal and the cylindrical peripheral wall 12 has a recess 16 extending about its right end in FIG. 1 and connected to a beaded shoulder 18 which forms a support surface for a sealing ring 20. A view plate 24 is pressed against the sealing ring by a front ring 22. The front ring 22 is slid onto the peripheral wall 12 and has at least one claw 26 which is pressed inwardly and which engages the recess 16, thereby securing the front ring.

A gauge member support 27 is inserted through an opening 25 in the lower portion of the peripheral wall 12 in such a manner that the connecting end 28 thereof projects from the housing 10. The gauge member support 26 is firmly screwed to the rear wall 14 with the aid of screws 30 and lock washers 32. The gap between the gauge member support 27 and the opening 25 is sealed with the aid of a sealant 36 and a a ring 34 which is pressed onto it from the outside.

The gauge member support 26 is firmly connected with a gauge member in the form of a Bourdon tube 38 whose interior communicates with a bore (not shown) in the gauge member support. The Bourdon tube is acted upon through this bore by the fluid pressure to be measured. The free end of the Bourdon tube is articulated by means (not shown) with a pointer mechanism 40 which is known per se and will therefore not be described in detail. The pointer mechanism 40 converts the deflection of the free end of the Bourdon tube into a rotational movement of a pointer shaft 42 on which a pointer 44 is mounted. A scale 46 is secured to the pointer mechanism 40 on which the position of the pointer 44 can be read off.

A circular opening 50 which is only indicated by a dotted line in FIG. 2 is located in the rear wall 14. A circular closure element 52 is inserted into the opening 50 and is shown in FIGS. 3 and 4 on an enlarged scale. The closure element 52 sealingly closes the opening 50 and fits so tightly in the opening 50 that it can only be pressed out of the opening if the internal pressure in the housing 10 exceeds a specific limit. This limit is selected so that it is not attained during normal operation of the pressure gauge and only occurs if the interior of the Bourdon tube breaks due to excessive pressure. The closure element 52 thus constitutes a safety feature to prevent bursting or explosions.

The closure element consists substantially of a disc 54 which has an open groove 56 which extends radially outwardly on the edge. The course of the groove 56 matches the edge of the opening 50. The groove 56 turns into a rounded bead 58 on its left side in FIG. 3. On the right side in FIG. 3, an annular shoulder 60 positioned in a radial plane connects to the groove 56. The groove 56, the bead 58 and the annular shoulder 60 are dimensioned so that the closure element can be pushed into the opening 50, thereby engaging the edge of the opening 50 in the groove 56, while the annular shoulder 60 abuts on the external side of the rear wall. It goes without saying that such pressure is ensured between the edge of the opening 50 on the one hand and the groove 56 on the other hand so that the opening 50 is sealed and the closure element 52 is retained in the opening due to this interference fit and due to the bead 58 until the internal housing pressure attains a specific value.

A second annular groove 62 which is open in the axial direction of the disc is formed on the left side of the disc 54 as shown in FIG. 3. The edge of a cup-shaped membrane or bellows 64 is inserted into the second groove 62. The edge of the membrane 64 is sealingly cemented in the groove 62 with the disc 54 by means of an adhesive 66'. A chamber 66 defined by the membrane 64 and the closure element 52 communicates with the ambience through a vent hole 68.

The membrane is manufactured of an elastomeric material and the closure element is preferably of plastic. The disc 64 and the closure element 52 preferably have a diameter amounting to one-third of the housing diameter. Typical materials for the membrane are polyurethane and materials with similar properties. Typical materials for the closure element are polyurethane and materials with similar properties. Typical dimensions are:

diameter of the membrane; 25 mm (1 in)
diameter of the closure element; 35 mm (1 3/8 in)
total height of the membrane + closure element 15 - 30 mm (⅝ - 1 3/16 in).

When the afore-cited pressure gauge is completely assembled and adjusted except for inserting the closure element, it is filled with the damping liquid through the opening 50. The closure element 52 together with the membrane 64 which has already been secured thereto, is thereafter pressed into the opening 50. The housing 10 is then sealed. The interference fit between the closure element 52 and the edge of the opening 50 can be selected without consideration of the material of which the membrane 64 is made so that the closure element is sufficiently tight. There is no danger that the membrane will be squeezed and damaged. There is no danger either that the closure element and the membrane will inadvertently separate prior to insertion.

The membrane 64 acts as a pressure equalizing device, since it is so soft that it yields to changes in the volume of the filling in the housing so that, in particular, no excess pressure as compared to the ambience can occur within the housing during normal operation.

An additional filling opening can of course be provided for filling the damping liquid. In this case, the closure element is inserted prior to filling. Furthermore, it goes without saying that the housing must not necessarily be filled with damping liquid.

Although the invention was explained above with reference to one specific embodiment, it is not restricted to this embodiment alone. Numerous modifications and changes are possible which do not exceed the scope of the invention as defined by the following claims:

What is claimed is:

1. A pressure gauge comprising
   a rigid housing having a peripheral wall, a front side and a rear side;
   a view plate mounted to seal said front side;
   a gauge member located within said housing;
   an elongated gauge support member having one end extending outside said housing to provide a support for said pressure gauge and its other end extending inside said housing to provide a mounting for said gauge member;
   a pointer mechanism and pointer connected with said gauge member for articulated movement observable through said view plate;
   said rear side formed as a wall having an opening therein formed with an edge thereof;
   a closure element corresponding in size to said opening and having a first groove extending about its periphery to sealingly engage said edge of said opening thereby retaining said closure element in said opening;
   said closure element having a second groove extending about its periphery, said second groove located so as to provide an opening into the interior of said housing;
   a resilient membrane extending into said housing and having its edge sealingly secured within said second groove opening along its entire length; and
   said closure element having a vent hole and capable of being pressed out of said opening when the pressure in said housing exceeds a specific value.

2. A pressure gauge according to claim 1 wherein said housing, said opening and said first and second grooves are circular in shape, and said resilient membrane is secured in said second groove by means of an adhesive.

3. A pressure gauge according to claim 1 wherein said closure element includes a rounded bead adjacent said first groove on the side facing the interior of the housing, and an annular shoulder adjacent said groove on the other side, said rounded bead and said annular shoulder abutting said rear side wall adjacent said edge of said opening.

4. A pressure gauge according to claim 2 wherein the diameter of said closure member is approximately equal to one-third of the diameter of said housing.

* * * * *